United States Patent
Chess et al.

(10) Patent No.: US 8,214,474 B2
(45) Date of Patent: Jul. 3, 2012

(54) AUTONOMIC COMPUTING SYSTEM WITH MODEL TRANSFER

(75) Inventors: David Michael Chess, Mohegan Lake, NY (US); Rajashi Das, New Rochelle, NY (US); James Edwin Hanson, Yorktown Heights, NY (US); Alla Segal, Mount Kisco, NY (US); Gerald James Tesauro, Croton-on-Hudson, NY (US); Ian Nicholas Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 11/406,019

(22) Filed: Apr. 18, 2006

(65) Prior Publication Data

US 2007/0245004 A1   Oct. 18, 2007

(51) Int. Cl.
*G06G 7/48* (2006.01)
*G06F 9/45* (2006.01)
*G06F 15/173* (2006.01)

(52) U.S. Cl. ............... 709/223; 709/226; 703/6; 703/22
(58) Field of Classification Search ........... 709/223–226
See application file for complete search history.

(56) References Cited

U.S. PATENT DOCUMENTS

| | | | |
|---|---|---|---|
| 7,620,537 B2 * | 11/2009 | Johnson et al. ................ | 703/22 |
| 2002/0018475 A1 * | 2/2002 | Ofek et al. .................... | 370/400 |
| 2004/0060044 A1 * | 3/2004 | Das et al. ..................... | 717/171 |
| 2004/0068351 A1 * | 4/2004 | Solomon ........................ | 701/24 |
| 2005/0071449 A1 * | 3/2005 | Alex et al. .................... | 709/223 |
| 2005/0086331 A1 * | 4/2005 | Wadia et al. .................. | 709/221 |
| 2007/0250212 A1 * | 10/2007 | Halloran et al. ............. | 700/245 |

OTHER PUBLICATIONS

K. Jenkins, K. Hopkinson, and K. Birman, A Gossip Protocol for Subgroup Multicast, In International Workshop on Applied Reliable Group Communication, WARGC, (Apr. 2001).
R. Van Renesse, K.P. Birman and W. Vogels,Astrolabe:A Robust and Scalable Technology for Distributed System Monitoring,Management,and Data Mining, ACM Transactions, 21:2(2003).

* cited by examiner

*Primary Examiner* — Ian N Moore
*Assistant Examiner* — Thai Nguyen
(74) *Attorney, Agent, or Firm* — August Law, LLC; George Willinghan (57) ABSTRACT

Methods and systems are provided for autonomic control and optimization of computing systems. A plurality of component models for one or more components in an autonomic computing system are maintained in a system level database. These component models are obtained from a source external to the management server including the components associated with the models. Component models are added or removed from the database or updated as need. A system level management server in communication with the database utilizes the component models maintained in the system level database and generic component models as needed to compute an optimum state of the autonomic computing system. The autonomic computing system is managed in accordance with the computed optimum state.

14 Claims, 5 Drawing Sheets

Fig. 5

AUTONOMIC COMPUTING SYSTEM WITH MODEL TRANSFER

FIELD OF THE INVENTION

The present invention is directed to the field of autonomic computing systems.

BACKGROUND OF THE INVENTION

Autonomic computing systems include self-managing computing systems arranged to handle the increased complexity of computing systems, in particular in distributed computing systems such as those used in large scale computer networks. These large scale networks run a variety of applications including communication and network based applications and deal with a variety of different computational tasks. Additional complexity is introduced from the functionality required to support mobile computing and communication functionalities for devices such as laptop computers, cellular phones and personal digital assistants.

Control of large scale systems includes management and allocation of system resources. Manual management and resource allocation using one or more human operators is time-consuming, expensive and error-prone. Autonomic computing systems, therefore, manage themselves largely without direct human intervention. An operator in the autonomic computing system defines and inputs rules and policies that the autonomic computing system uses as guidelines or parameters in controlling the computing system. In general, the autonomic computing system utilizes closed control loops to monitor a given system resource and to keep the allocation or utilization of this resource within the parameters specified by the operator. The autonomic control system employs self-management decisions to monitor and control the system resource or system resources of a given closed control loop.

Self-managing systems make some self-management decisions using optimization, configuration and related calculations. These calculations are typically performed using system models, which are representations of the likely behavior of various parts of the system, and the environment in which the system runs, under a variety of possible circumstances. These calculations are used, for instance, when the system estimates the impact on its overall behavior of possible changes to the allocation of resources, the setting of component control variables and other management actions. For a given autonomic computing system, these calculations can be executed in a single centralized location or in a plurality of concurrent decentralized locations. Current applications of either centralized or decentralized approaches have strengths and weaknesses.

Performing the calculations in a centralized manner, where one part of the autonomic computing system utilizes a model that includes a variety of system components and the interactions among these components, results in the advantage of having more information available and taking more interactions into account when making control and allocation determinations. This increased amount of information results in obtaining better results. However, centralized approaches have the disadvantage of requiring frequent software updates to the part of the autonomic software system doing the global calculation to enable that part to accurately model new types of components in the system. In complex heterogeneous systems, replacing a piece of central decision-making software every time a new kind of component is added is not a practical requirement.

Decentralized approaches overcome this disadvantage of a centralized system by having each component of the system, at a given level of granularity, responsible for the details of its own modeling. Each component handles at least some amount of calculation and optimization and passes the quantitative results of these calculations and optimizations to more global optimizers and decision makers in a generally standardized or generic format. The global optimizers then perform more global or centralized optimization calculations on the data received from a variety of individual components. In this decentralized approach, adding a new type of component to the system requires no changes to the parts of the system doing the more global calculations, as long as the new type of component can express the results of its own calculations in the desired standardized format. The decentralized approach, however, does not provide for the calculations done in the individual components to benefit from the more global information potentially available at higher levels of the system. Therefore, the overall results of the decentralized system are less optimal.

Therefore, autonomic computing systems and methods for operating autonomic computing systems are required that provide for the simplicity of operation and updating found in decentralized systems with the increased level of optimization found in centralized systems.

SUMMARY OF THE INVENTION

The present invention is directed to systems and methods that provide for the autonomic control and optimization of computing systems by utilizing a plurality of component-supplied component models to determine a preferred operating state of the computing system. This preferred operating state can be an optimum state or a state that is closer to an optimum state than the current operational state. An exemplary method for autonomic system management maintains component models for one or more components in an autonomic computing system that includes a plurality of components. These component models can be located in, for example, a repository or database that is accessible on a system-wide basis. The component or node within the computing system holding the component models is in communication with a management server for the autonomic computing system. Maintenance of the component models includes updating existing component-supplied component models as needed, adding a new component model for each new component added to the autonomic computing system and removing existing component models associated with components that have been removed from the system.

In order to provide for increasing the level of optimization of the computing system containing the plurality of components, all of the component models maintained in the system level database are retrieved by the management server. If a component model does not exist for a particular component, the management server uses a generic model for that component. The component models and the generic component models are used to compute an updated operational state for the autonomic computing system that is closer to an optimum operational state of the computing system than the current operational state. The autonomic computing system is managed in accordance with the computed updated operational state. Management of the autonomic computing system includes adjusting operational states of one or more components, setting control variables for one or more components, adjusting resource allocation within the autonomic computing system and combinations thereof.

DETAILED DESCRIPTION

Figure 1:
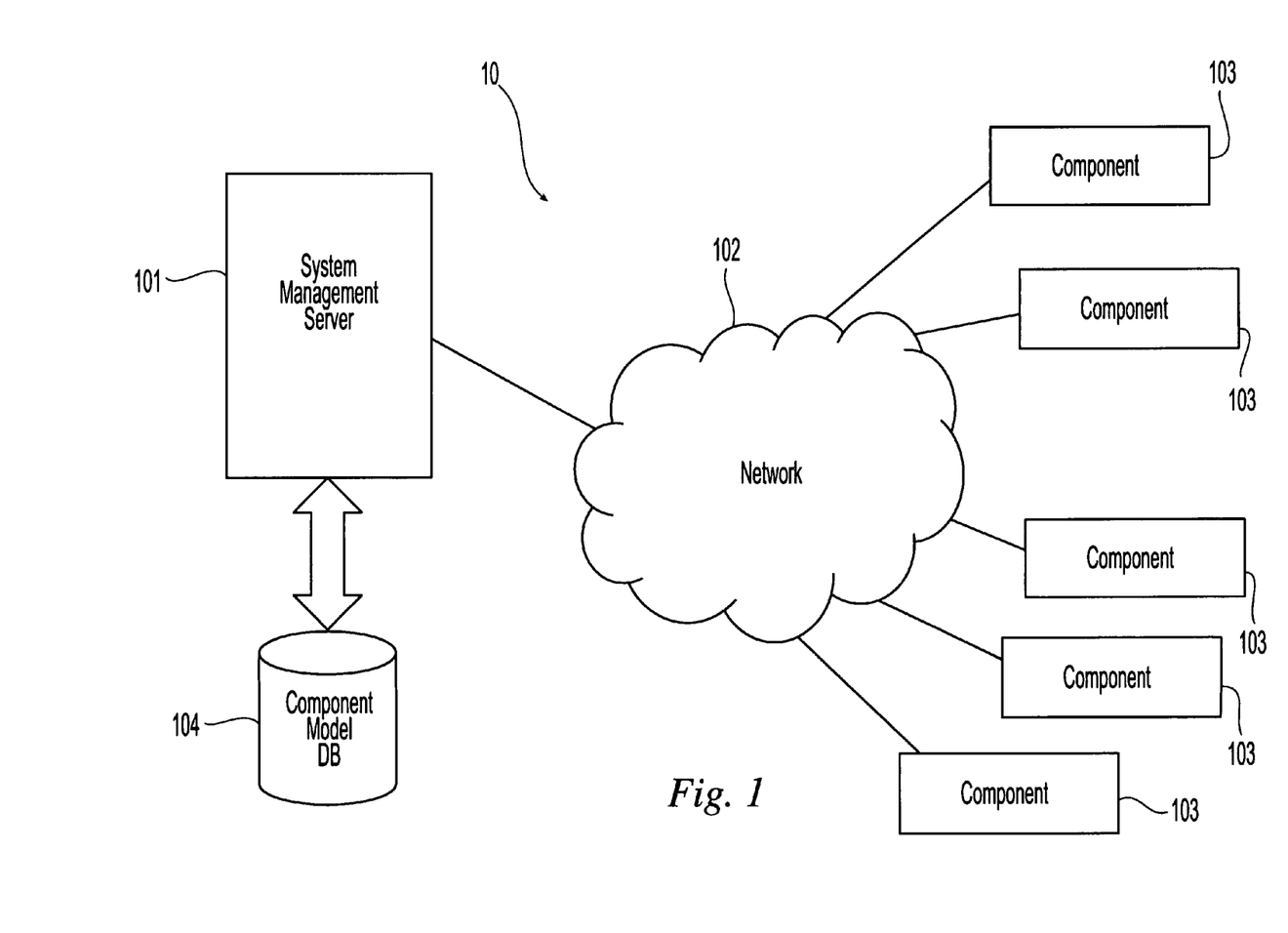
FIG. 1 is a schematic representation of an embodiment of an autonomic computing system in accordance with the present invention.

Referring initially to FIG. 1, an exemplary embodiment of an autonomic computing system 10 for use in improving system behavior or performance through improved model transfer is illustrated. In one embodiment, the computer system 10 includes a management server 101 that contains the hardware and software to manage computer systems including, for example, enterprise-wide administration of distributed computer systems. In one embodiment, the management server is a system level management server. Although illustrated as a single server, systems management can be providing by a plurality of management servers in communication with each other across one or more networks. The management server can be a single centralized server, or a plurality of management servers can be arranged in a nested or peer-to-peer arrangement. The functionalities of the management server can be performed by a single server or these functionalities can be handled by a plurality of servers that change over time or based upon the types of functions to be executed. Suitable equipment to be used as servers are known and available in the art. The management server 101 provides various functionalities to the autonomic computing system including, but not limited to, management of groups of distributed computers, remote control, patch management, software distribution, operating system deployment, maintaining an inventory of both hardware and software within the computing system, client management, security enforcement, configuration management, provisioning, software deployment, package management, identity management, policy management, fault management, troubleshooting, error logging, data recovery, performance management, software metering, event monitoring, statistics gathering, starting and stopping applications, traffic routing, storage area network (SAN) zone control and combinations thereof.

The computing system 10 also includes a plurality of distributed system components 103. These distributed components include, but are not limited to, information technology (IT) components, computers, routers, databases, web servers, autonomic storage units, SAN controllers, performance monitors and database servers. The distributed components 103 are in communication with each other and with the management server 101 across one or more networks 102. Suitable networks 102 include, but are not limited to, local area networks (LAN), e.g. an Ethernet network, wide area networks (WAN), for example the Internet, secure local and wide area networks, secure wireless networks, enterprise-wide networks, storage area networks, virtual private networks, secure virtual private networks, internet area networks, internet secure networks, personal area networks, public switched telephone networks (PSTN) and combinations thereof.

In one embodiment, the computing system 10 includes a database 104 or other suitable storage medium. The database 104 can be local to a given component, server or node or can be a system level database in that it is accessible to all system components and the management server. In another embodiment, the computing system includes a plurality of databases 104. The database 104 is in communication with the management server 101 either through a direct communication connection or across one or more networks 102. Suitable databases include any type of fixed or removable storage medium capable of storing computer system data and of communicating that data to the management server 102. The database contains data and information that are used by the management server in operating the autonomic computing system. In one embodiment, the database contains a plurality of component models. Each component model is capable of modeling one of the components in the system, for example the component that supplied that model to the computer system. In addition, the component model is maintained, i.e. created or updated, by the computing system. In one embodiment the component model is maintained by the component that supplied that model, and maintenance is independent of the management server. Therefore, the management server does not have to create models for use in optimizing the autonomic computing system. Instead, the management server uses one or more models for each component in the computer system that were obtained from sources external to the management server to increase or to optimize the behavior or performance of the autonomic computing system.

Figure 2:
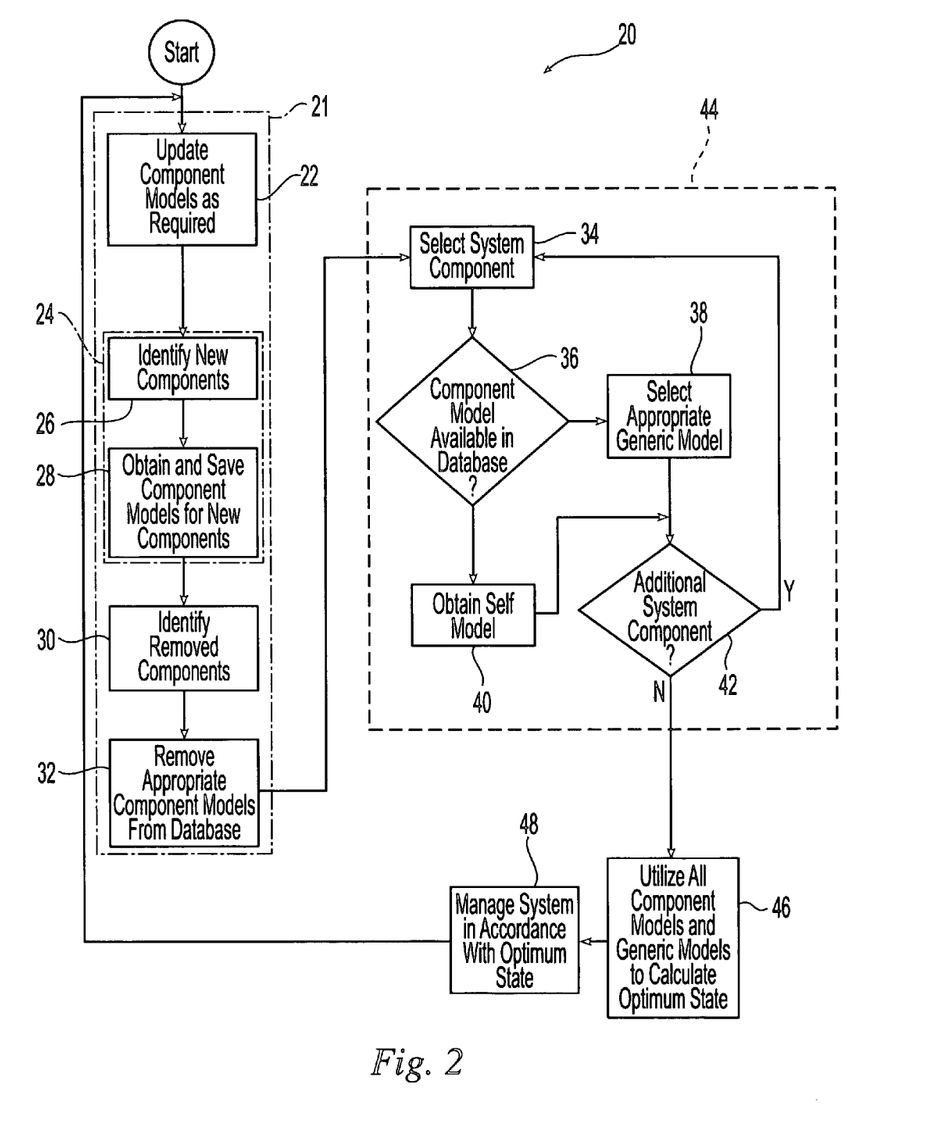
FIG. 2 is a flow chart illustrating an embodiment of a method for autonomic control of a computing system in accordance with the present invention.

Referring to FIG. 2, an exemplary embodiment of a method for autonomic system management 20 in accordance with the present invention is illustrated. In accordance with the exemplary embodiment, component models for one or more components in an autonomic computing system containing a plurality of components are maintained in the autonomic computing system 21. The component models can be maintained or stored in a plurality of suitable repositories disposed either internal to or external to the autonomic computing system. These repositories includes databases, including both system wide databases and databases associated with a given component or node within the computing system or any other suitable storage medium. The repository can be at a designated centralized location that is used specifically to hold the component models. Alternatively, the location of the repository can vary over time and can be moved between components or nodes within the system. In one embodiment, a plurality of repositories is provided. These repositories can be arranged in any type of hierarchical structure including a nested structure.

At least one, and preferably all, of the component models maintained in the autonomic computing system or system repository are obtained from a source external to the management server. Suitable external sources include, but are not limited to, third party databases or repositories, web-based databases and removable storage media. In one embodiment, at least one component model is obtained from a given component within the computing system. For example, the component models can be hard programmed into the component or provided on storage disks associated with the component. Component models obtained from system components can be component-specific, applicable to two or more system components or generic. In one embodiment, a given component model reflects or models the state or behavior of a component to which the model is associated under a variety of conditions of the system. Therefore, the management server uses each component model to determine and control the behavior of components within the computing system for purposes of improving overall system behavior or performance or providing system optimization and also to develop a system-wide model for autonomic computing system performance. This eliminates the need for the management server to self-generate component models for one or more of the system components. In order to facilitate the use of the component models, including any component-supplied models, by the management server, the repository is in communication with the management server, and the component models are accessible by the management server.

Maintaining the component models in the autonomic computing system includes updating, adding and removing the component models. In one embodiment, maintaining the component models in the autonomic computing system also includes updating existing component models in the autonomic computing system 22. The existing component models are updated as needed. Updates can be accessed and retrieved by the management server directly from each component or from another external source such as a centralized or web-based repository in response to a notification that an update is available. Alternatively, a given component proactively forwards model updates as they become available. In another embodiment, maintenance of the component models in the autonomic computing system includes adding a new component model for each new component added to the autonomic computing system 24. The addition of new models can be accomplished through a process involving the active recognition of new system components by the management server and the retrieval of the associated component models. Alternatively, each added component locates and notifies the management server and supplies its model. In one embodiment, the addition of the new component model further involves identifying new components that are added to the autonomic computing system 26 and obtaining a new component model from each new component 28.

Figure 3:
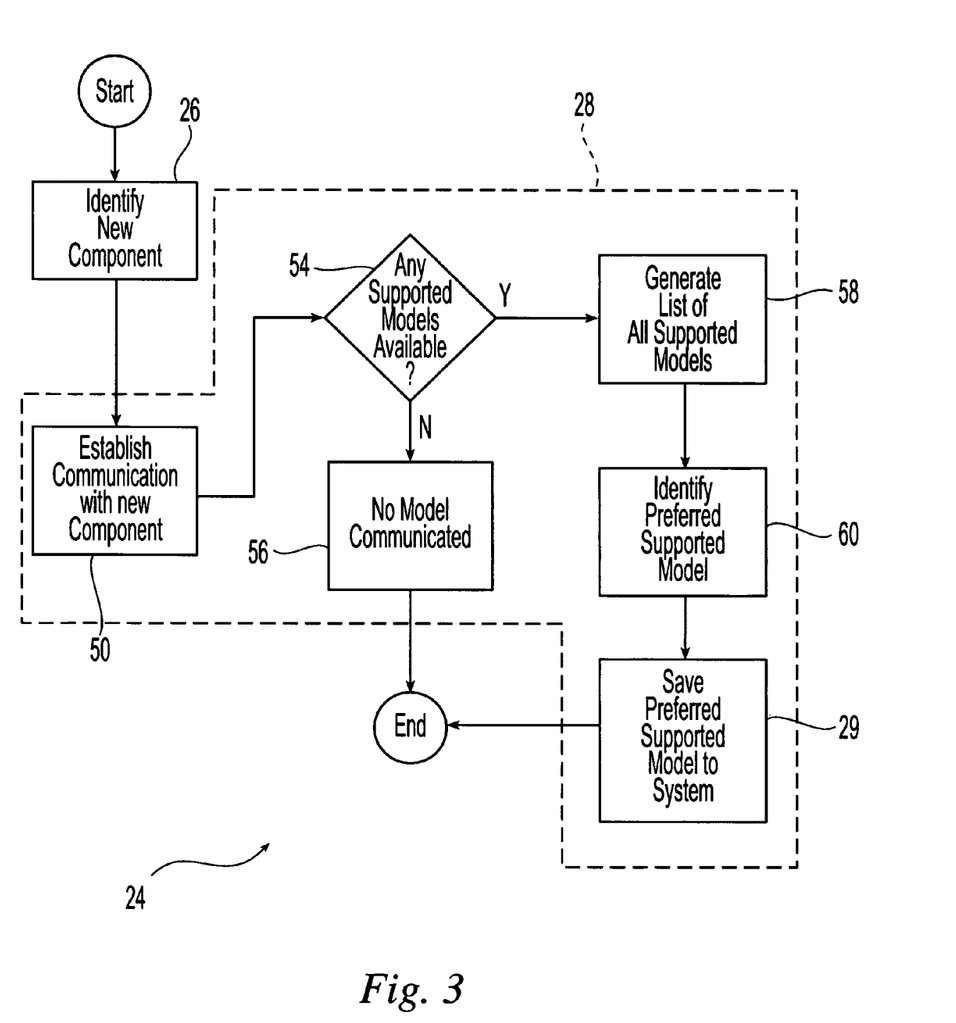
FIG. 3 is a flow chart illustrating an embodiment of a method for updating component models for use in methods in accordance with the present invention.

One exemplary embodiment of a method for adding new component models in response to the addition of new components to the computing system 24 is illustrated in FIG. 3. As illustrated, the system level management server identifies the addition of each new component 26 and obtains the new component model from that component 28. Obtaining each new component model includes establishing communication between the management server and each new component 50. Systems and methods for establishing communication between a management server and a system component are known and available in the art, and any suitable method can be used. The management server then searches for any and all new component models 54 that are available in a format or model-representation language that the management server understands or that is supported by the management server. This search includes searching databases or storage media associated with each new component and searching centralized databases, for example in a web-based network environment. If no component models exists or if component models do exist but are not in a compatible format, then no model is retrieved or communicated to the system management server 56. If supported models are available, a list of all new component models supported by the management server is generated 58. From this generated list, a preferred new component model is identified for each new component 60. Suitable methods for identifying preferred component models include, but are not limited to, random selection and selection of the component model represented in the language that the management server prefers most highly. Each identified preferred new component model is communicated to the management server and is saved or stored in the autonomic computing system 29.

Figure 4:
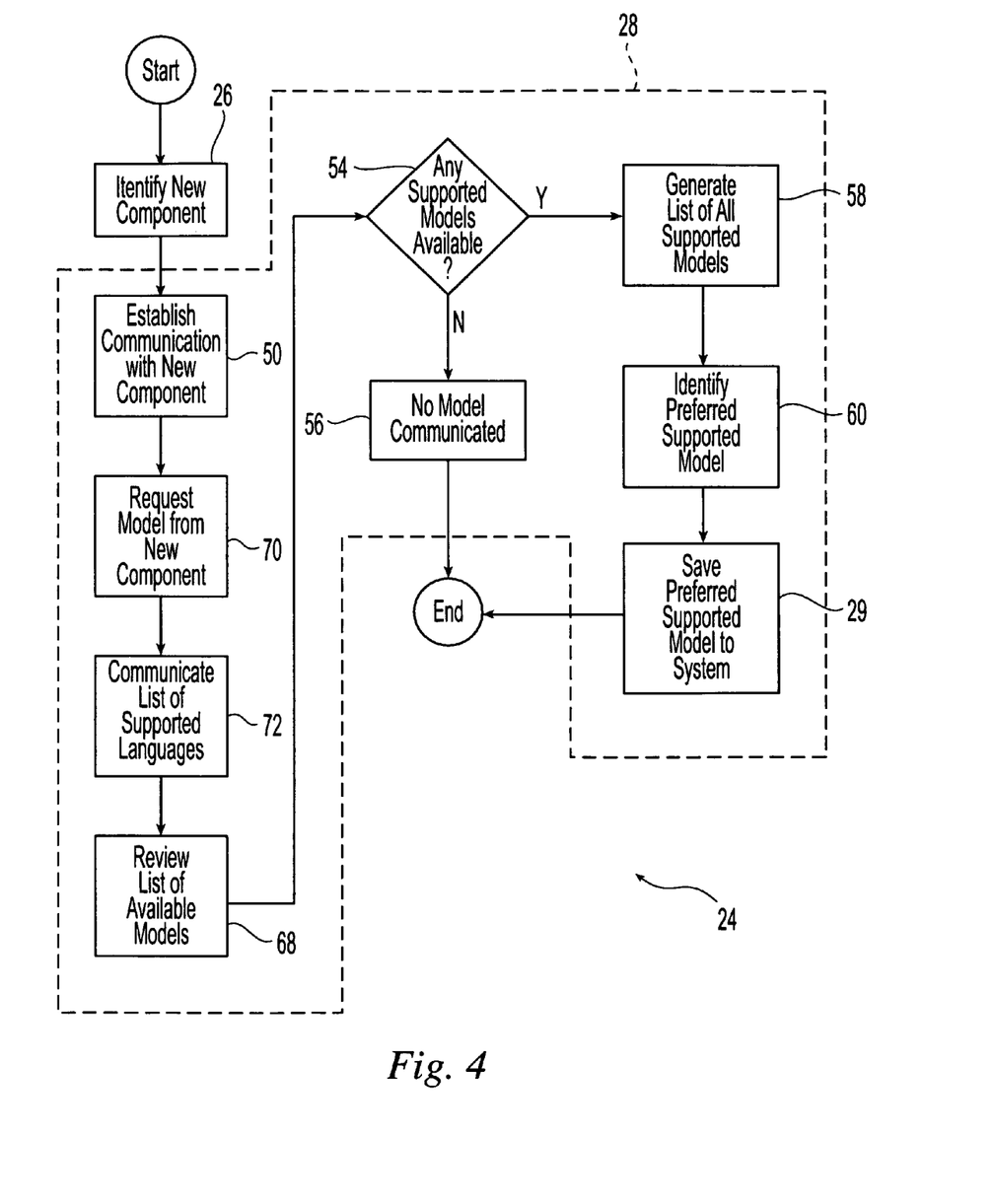
FIG. 4 is a flow chart illustrating another embodiment of a method for updating component models for use in methods in accordance with the present invention.

Referring to FIG. 4, in another embodiment of a method for adding new component models in response to the addition of new components to the computing system 24, the management server again identifies the addition each new component 26 and obtains the new component model from that component 28. In order to obtain the new component model, the management server establishes communication between the management server and each new component 50. The system management server requests a new component model from each new component 70 and communicates a list of formats or model-representation languages that the management server understands or that are supported by the management server for the new component model to each new component 72. Each component then reviews all available new component models 68. These models can be located in a database or storage medium that is local to the component or in a centralized repository that is accessed across one or more networks. Each new component then determines if any component models are available in a language or format that is supported by the management server 54. If no supported models are available, then no model is communicated to the management server 56. To the extent that component models are available in a supported format, each new component generates a list of all new component models expressed in languages or formats supported by the management server 58. From this list, a preferred new component model is identified 60, for example from the generated list. Suitable methods for choosing a preferred model are the same as those expressed above. Once the preferred component model has been identified and communicated to the management server, this component model is saved to the autonomic computing system 29.

Figure 5:
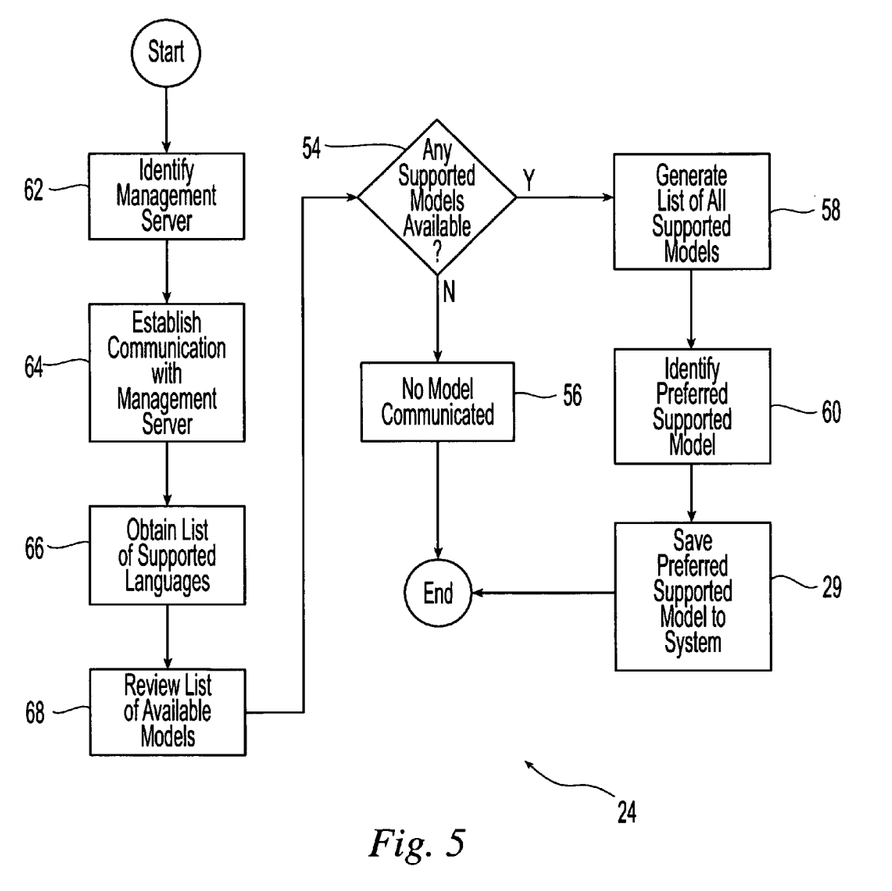
FIG. 5 is a flow chart illustrating yet another embodiment of a method for updating component models for use in methods in accordance with the present invention.

Referring to FIG. 5, another embodiment for adding new component models in response to the addition of new components to the computing system 24 is illustrated. In general, each new component contacts a management server to initiate the transfer or transmission of a new component model. Initially, the new component identifies, locates and contacts the management server 62. Suitable methods for identifying the management server include, but are not limited to, using service discovery and invocation methods. Communication is then established between the system management server and the new component 64, using, for example, communication methods and protocols known and available in the art. Each new component, obtains from the management server information, i.e. a list, reflecting the model-representation languages that the management server understands or supports 66. Each component then reviews all available new component models 68. These models can be located in a database or storage medium that is local to the new component or in a centralized repository that is accessed across one or more networks. In one embodiment, the component models are integrated into each new component, i.e. in firmware. In another embodiment, the component models are supplied on an installation medium such as a computer disk, CD or DVD or accessed in a central repository over the Internet. Each new component reviews all available self-models, i.e. models reflecting the state or behavior of the component under a variety of conditions, to determine if they are any component models available to it a language or format that the management server understands 54. If no supported models are available, no model is transmitted to the management server and communication between the component and the management server is terminated. To the extent that component models are available in a supported format, each new component generates a list of all new component models expressed in languages or formats supported by the management server 58. From this list, a preferred new component model is identified 60, for example from the generated list. Suitable methods for choosing a preferred model are the same as those expressed above. Once the preferred component model has been identified and communicated to the management server, this component model is saved to the autonomic computing system 29.

In one embodiment, maintenance of the component-supplied component models in the autonomic computing system 21 also includes removing outdated, expired or superfluous models from the autonomic computing system repository. In one embodiment, existing components that have been removed from the autonomic computing system are identified 30. All component models associated with the removed components are identified, and the existing component models associated with the removed components are removed from the autonomic computing system 32. Any method suitable for removing data in an electronic format from an autonomic computing system can be used.

Returning to FIG. 2, the management server utilizes the one or more of the component models stored in the autonomic computing system to optimize the behavior, performance or operation of the autonomic computing system. In one embodiment, the management server accesses at least one and preferably all available component models maintained in the autonomic computing system 44. Initially, the management server selects a component within the computing system 34 and determines if a component model is stored in the autonomic computing system that corresponds to the selected component 36. If a corresponding model does exist, the management server selects and retrieves the appropriate component model 40. If a corresponding model does not exist, the selected component is identified as a component within the autonomic computing system for which a component model is not maintained in the autonomic computing system. Therefore, the management server obtains a generic model for each identified component that lacks a component model in the autonomic computing system 38. These generic models can be stored in the autonomic computing system or in any other suitable repository accessible by the management server. After either a corresponding or generic model is obtained for the selected system component, a determination of whether or not additional system components exist for selection 42 is made. The process of system selection and model retrieval repeats until the desired number of component models, either corresponding or generic, has been retrieved for all system components.

Having retrieved components models one or more of the system components, an updated operational state of the autonomic computing system is computed using the accessed and retrieved component models, and as appropriate any generic component models 46. Any suitable method for computing an operational state using models can be used. Exemplary methods include, but are not limited to, optimization, utility estimation and service-level management. Calculating an updated operational state includes determining an operational state for the autonomic computing system that exhibits improved system behavior or performance in at least one measure of behavior over the current operational state of the autonomic computing system. Any suitable measure of system behavior as known and available in the art, i.e. processor utilization, resource allocation, bandwidth partitioning or response time, can be used. Although in one embodiment the updated operational state corresponds to an optimum operational state of the autonomic computing system, in general the updated operational state is closer under a given measure of behavior to an optimum state than the current operational state. Therefore, in one embodiment, calculation of the updated operational state involves satisfying rather than optimizing various component models, and in general, management of the computing system in accordance with the updated operational state calculation involves moving the system to, or towards, a calculated optimum.

The entire autonomic computing system and all of the components contained therein are managed in accordance with the computed updated operational state 48. Management of the autonomic computing system in accordance with the computed updated operational state includes, but is not limited to, adjusting operational states of one or more components, setting control variables for one or more components, adjusting resource allocation within the autonomic computing system and combinations thereof. Maintenance of the models in the autonomic computing system, model access and updated operational state computation are repeated continuously to provide for autonomic control of the computing system.

Although illustrated as a single computing system with a simple one level control hierarchy containing a management server, exemplary methods in accordance with the present invention can be used with a variety of control structures. In one embodiment, the autonomic computing system is organized into a plurality of hierarchical levels. Each component of the system sends either its own component model or a composite model containing a plurality of lower level system components that it represents to the next more global, i.e. higher, level of the system. The highest or top level of the hierarchy is the level representing an entire autonomic computing system, for example a data center or an entire enterprise. The top level decision maker corresponding to the highest level management server, combines all the lower level models into an overall model for the system that is used in optimization and configuration decision-making. Therefore, the management server changes over time or as one progresses through levels of the system. At any given time, the management server manages the system in accordance with the present invention.

In one embodiment, system and methods in accordance with exemplary embodiments of the present invention calculate optimization states in a single, generally centralized management server. Detailed information and data that are available to the central decision maker, including complex interactions and tradeoffs between components, are taken into account when making the optimization calculation. However, each component within the computing system is responsible for providing the central or system level management server with the model that will be used to represent that component, and the central management server does not have to be replaced or updated or reprogrammed every time a new kind of component is introduced into the autonomic computing system.

In another exemplary embodiment in accordance with the present invention, the autonomic computing system is not arranged with a centralized, nested or tiered hierarchy but is organized in a decentralized peer-to-peer architecture. In accordance with this embodiment, the function of the management server is handled by various peers or nodes in the system. These peers or nodes can also be the components, and the functions of the management server can move among the various nodes over time. Therefore, similar to the nested or hierarchical structure, at any given time, any one of a number of nodes can be the management server. In one embodiment, each component forwards or transfers its component models to one or more of the other components in the system using peer-to-peer file sharing protocols, for example commercially available peer-to-peer file sharing protocols such as Napster or Gnutella or a specially-designed, proprietary peer-to-peer protocols. In this peer-to-peer environment, one or more components, nodes, peers or management servers will obtain a sufficient number of components models to form a sufficiently detailed aggregate model for the computing system. Any one of these aggregate models can be used as the management server to perform system wide optimization. In one embodiment, a standard leader election algorithm is used to select which components, out of the plurality of components possessing sufficiently detailed aggregate models, perform the system wide optimization.

In another exemplary embodiment, the components in the autonomic computing system are grouped into a plurality of local zones using, for example, geography or Domain Name Service (DNS) hierarchy. The components within a given zone share model information with each other using an epidemic "gossip" protocol. An example of a suitable epidemic "gossip" protocol is described in K. JENKINS, K. HOPKINSON, AND K. BIRMAN, *A Gossip Protocol for Subgroup Multicast*, In International Workshop on Applied Reliable Group Communication, WARGC, (April 2001). Components within a given zone elect one or more components within that zone to communicate model information on behalf of the zone with other components outside the zone. By applying the local zone concept recursively the system-wide aggregate model information can be conveyed to one or more top-level components. These top-level components perform the desired system wide global self-management decision making. An example of a recursive application of the local zone concept is found in R. VAN RENESSE, K. P. BIRMAN AND W. VOGELS, *Astrolabe: A Robust and Scalable Technology for Distributed System Monitoring, Management, and Data Mining*, ACM Transactions on Computer Systems, 21:2, 164-206 (2003).

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for autonomic system management in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for autonomic system management comprising:

maintaining within an autonomic computing system a plurality of component models, each component model associated with one of a plurality of components in the autonomic computing system, each component model simulating the operation of its associated component to predict a state and performance of that component for various operational conditions of the entire computing system, wherein each component model is supplied to the autonomic computing system by and maintained by its associated component independent of a centralized management server and all of the component models are accessible by the centralized management server, wherein maintaining the component models further comprises adding a new component model for each new component added to the autonomic computing system by:
  identifying new components added to the autonomic computing system; and
  obtaining a corresponding component model from each new component by:
    establishing communication between the centralized management server and the new component;
    searching at least one source external to the centralized management server for all new component operational models associated with the new component and supported by the centralized management server;
    generating a list of all new component operational models supported by the centralized management server;
    identifying a preferred new component operational model from the generated list; and
    obtaining the identified preferred new component operational model from the source external to the centralized management server;
  accessing the component models maintained in the autonomic computing system using the centralized management server;
  using the centralized management server and accessed component models to develop a system-wide operational model for autonomic computing system performance covering all of the components in the autonomic computing system;
  computing an updated operational state for the autonomic computing system using the system-wide model developed using the accessed component models, the updated operational state associated with improved autonomic computing system behavior in at least one measure of behavior over a current operational state of the autonomic computing system; and
  managing the autonomic computing system in accordance with the computed updated operational state.

2. The method of claim 1, wherein the step of maintaining the component models further comprises updating existing component models in the autonomic computing system.

3. A method for autonomic system management comprising:
  maintaining within an autonomic computing system a plurality of component models, each component model associated with one of a plurality of components in the autonomic computing system, each component model simulating the operation of its associated component to predict a state and performance of that component for various operational conditions of the entire computing system, wherein each component model is supplied to the autonomic computing system by and maintained by its associated component independent of a centralized management server and all of the component models are accessible by the centralized management server, wherein maintaining the component models further comprises adding a new component model for each new component added to the autonomic computing system by:
    identifying the new component to be added to the system;
    establishing communication between the centralized management server and the new component;
    communicating a list of supported languages for the new component model from the centralized management server to the new component;
    reviewing all available new component models;
    generating a list of all new component models expressed in languages supported by the centralized management server;
    identifying a preferred new component-supplied component model from the generated list; and
    communicating the identified, preferred new component-supplied component model from the new component to the centralized management server;
  accessing the component models maintained in the autonomic computing system using the centralized management server;
  using the centralized management server and accessed component models to develop a system-wide operational model for autonomic computing system performance covering all of the components in the autonomic computing system;
  computing an updated operational state for the autonomic computing system using the system-wide model developed using the accessed component models, the updated operational state associated with improved autonomic computing system behavior in at least one measure of behavior over a current operational state of the autonomic computing system; and
  managing the autonomic computing system in accordance with the computed updated operational state.

4. The method of claim 1, wherein the step of maintaining the component models further comprises:
  identifying existing components that have been removed from the autonomic computing system; and
  removing existing component models associated with the removed components from the autonomic computing system.

5. The method of claim 1, wherein:
  the step of accessing the component models further comprises:
    identifying components within the autonomic computing system for which component models are not maintained in the autonomic computing system; and
    obtaining a generic model for each identified component for which a component model is not maintained in the autonomic computing system; and
  the step of computing the updated operational state for the autonomic computing system further comprises computing the updated operational state for the autonomic computing system using the accessed component models and the obtained generic models.

6. The method of claim 1, wherein the step of managing the autonomic computing system in accordance with the computed optimum state further comprises adjusting operational states of one or more components, setting control variables for one or more components, adjusting resource allocation within the autonomic computing system or combinations thereof.

7. A computer-readable non-transitory storage medium containing a computer-readable code that when read by a computer causes the computer to perform a method for autonomic system management comprising:
  maintaining within an autonomic computing system a plurality of component models, each component model associated with one of a plurality of components in the autonomic computing system, each component model simulating the operation of its associated component to predict a state and performance of that component for various operational conditions of the entire computing system, wherein each component model is supplied to the autonomic computing system by and maintained by its associated component independent of a centralized management server and all of the component models are accessible by the centralized management server, wherein maintaining the component models further comprises adding a new component model for each new component added to the autonomic computing system by:

identifying new components added to the autonomic computing system; and obtaining a corresponding component model from each new component by:

establishing communication between the centralized management server and the new component;

searching at least one source external to the centralized management server for all new component operational models associated with the new component and supported by the centralized management server;

generating a list of all new component operational models supported by the centralized management server;

identifying a preferred new component operational model from the generated list; and obtaining the identified preferred new component operational model from the source external to the centralized management server;

accessing the component models maintained in the autonomic computing system using the centralized management server;

using the centralized management server and accessed component models to develop a system-wide operational model for autonomic computing system performance covering all of the components in the autonomic computing system;

computing an updated operational state for the autonomic computing system using the system-wide model developed using the accessed component models, the updated operational state associated with improved autonomic computing system behavior in at least one measure of behavior over a current operational state of the autonomic computing system; and managing the autonomic computing system in accordance with the computed updated operational state.

8. The computer readable non-transitory storage medium of claim 7, wherein all of the component models are obtained from a source external to the centralized management server.

9. The computer readable non-transitory storage medium of claim 8, wherein the source external to the centralized management server comprises a component associated with the component model supplied from the external source.

10. The computer readable non-transitory storage medium of claim 7, wherein:

the step of accessing the component models further comprises:

identifying components within the autonomic computing system for which component models are not maintained in the autonomic computing system; and obtaining a generic model for each identified component for which a component model is not maintained in the autonomic computing system; and the step of computing the updated operational state for the autonomic computing system further comprises computing the updated operational state for the autonomic computing system using the accessed component models and the obtained generic models.

11. The method of claim 1, wherein the method further comprises using the plurality of component models to develop a single system-wide performance model for the autonomic computing system.

12. The method of claim 1, wherein each component model is integrated into its associated component as firmware.

13. The method of claim 1, wherein each component comprises a hardware component.

14. The method of claim 1, wherein each component comprises a computer, a router, a database, a web server, an autonomic storage unit, a storage area network controller or a database server.

\* \* \* \* \*